United States Patent Office 3,541,602
Patented Nov. 17, 1970

3,541,602
ACETONIDES OF 9-HALOGENATED 3β,11β,16α,17α,
21-PENTAHYDROXYPREGNANES
Patrick A. Diassi, Westfield, N.J., assignor to E. R. Squibb
& Sons, Inc., New Brunswick, N.J.
No Drawing. Filed July 29, 1968, Ser. No. 748,194
Int. Cl. C07c 173/00
U.S. Cl. 260—239.55                 10 Claims

ABSTRACT OF THE DISCLOSURE

The invention disclosed herein teaches new pharmaceutically active compounds having the formulae

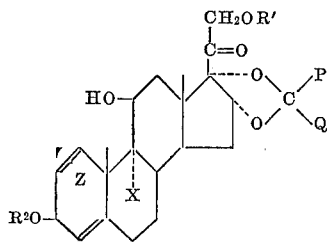

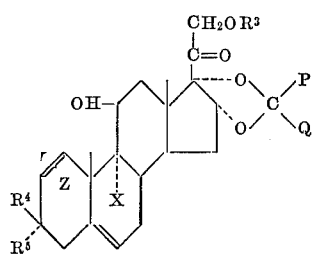

wherein R' is hydrogen or acyl; R² is hydrogen or acyl; R³ is hydrogen, acyl or 2-tetrahydropyranyl; the acyl in each instance being a hydrocarbon carboxylic acid of less than twelve carbons; R⁴ is hydroxy or acyloxy; R⁵ is hydrogen and R⁴ and R⁵ together are oxo (O=); X is halogen (e.g., chloro or fluoro); P is hydrogen, lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl, and Q is lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl, or together with the carbon atom to which they are joined P and Q are cycloalkyl or monocyclic heterocyclic; and Z indicates a single or a double bond. These new acetonides possess anti-inflammatory activity and can be prepared by various methods.

The compounds of this invention have the formulae

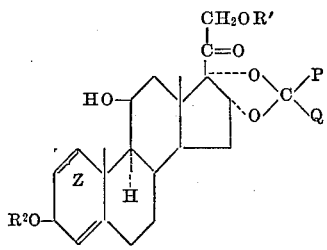

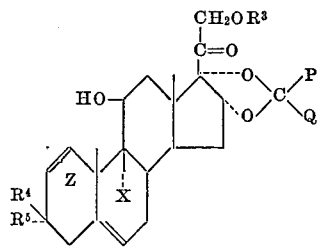

wherein R' is hydrogen or acyl; R² is hydrogen or acyl; R³ is hydrogen, acyl or 2-tetrahydropyranyl; the acyl in each instance being a hydrocarbon carboxylic acid of less than twelve carbons; R⁴ is hydroxy or acyloxy; R⁵ is hydrogen and R⁴ and R⁵ together are oxo (O=); X is halogen (e.g., chloro or fluoro); P is hydrogen, lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl, and Q is lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl, or together with the carbon atom to which they are joined P and Q are cycloalkyl or monocyclic heterocyclic; and Z indicates a single or a double bond.

The preferred acyl radicals are those of hydrocarbon carboylic acids of less than twlve carbon atoms, as exemplified by the lower alkanoic acids (e.g., acetic, propionic, butyric, and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The final products of this invention possess anti-inflammatory activity. Therefore, they can be employed in lieu of cortisone as anti-inflammatory agents in the treatment of acute inflammatory and allergic diseases of the eye, skin and mucosa. For these purposes, oral dosages may vary from about 0.05 to 1.5 mg./kg. daily, intramuscular dosages from about 0.1 to 4.5 mg./kg. daily, intravenous dosages up to about 1.5 mg./kg. daily (by drip) and topically, they may be administered as an 0.1 to 2.5% suspension, ointment, cream, or the like.

The novel compounds of this invention are prepared by processes disclosed herein which entail various steps starting with 9α-fluoro-16α-hydroxyhydrocortisone 16,17-acetonide, 9α-fluoro-16α-hydroxyprednisolone 16,17-acetonide their acylated derivatives and 21-(2-tetrahydropyranyl) ethers or 3,3-ethylenedioxy-9α-halo-11β,16α,17α,21-tetrahydroxypregna-5-ene-20-one 16,17-acetonide and 21-acylated as well as 16,17-acetal derivatives.

Preferred end products of this invention are 9α-halo-3β,11β,16α,17α,21-pentahydroxypregn-4-en-20-one 16,17-acetonide, 9α - halo - 3β,11β,16α,17α,21 - pentahydroxypregna-1,4-diene-20-one 16,17-acetonide and their acylated derivatives, 9α - halo - 11β,16α,17α,21-tetrahydroxypregn - 5 - ene - 3,20 - dione 16,17 - acetonide, 9α - halo-11β,16α,17α,21 - tetrahydroxypregna - 1,5 - diene - 3,20-dione 16,17-acetonide their acylated and acetal derivatives and 9α - halo - 3β,11β,16α,17α,21 - pentahydroxypregn-5-en-20-one 16,17-acetonide, 9α-halo-3β,11β,16α,17α,21-penahydroxypregna - 1,5 - diene - 20 - one 16,17 - acetonide and their 21-acylated derivatives.

The steps of the processes involved in this invention may be represented by the following equations.

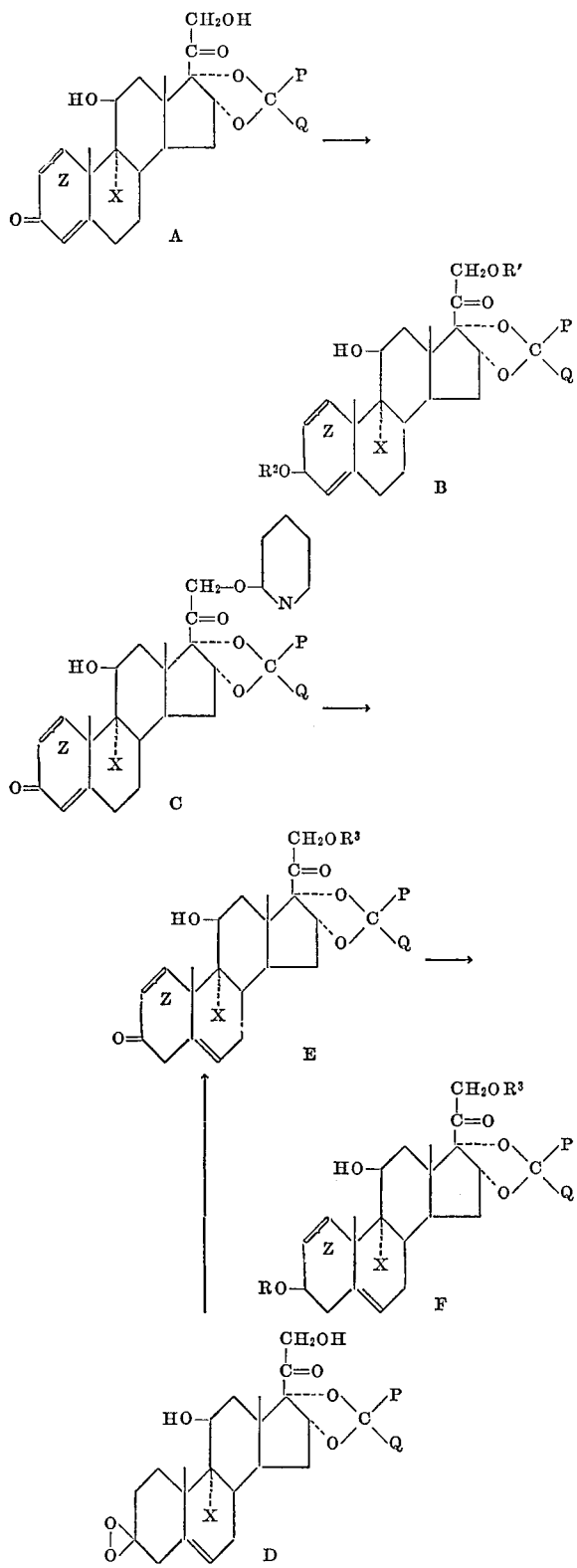

wherein P, Q, X and Z are as defined above and R is hydrogen.

Reduction of compounds of the general Formula A with specific reducing agents such as lithium aluminum tri-tertiary butoxyhydride yield the corresponding 3β-hydroxy derivative of the general Formula B. The reduced products may then be acylated, for example, by treating with acetic anhydride in pyridine or other acylating agents to obtain the corresponding 3,21-diacyl derivatives.

Compounds of the general Formula E can be prepared by either of two routes. One method involves reaction of 9α-halo-16α-hydroxyhydrocortisone 16,17-acetonide 21-(2-tetrahydropyranyl) ether or the 1-dehydro derivative with a base such as sodium acetylide or potassium t-butoxide and the like in an organic inert solvent such as benzene, xylene, or toluene. Alternatively, compounds of the general Formula E can be prepared by hydrolysis of ketals of the general Formula D under mild conditions such as acetic acid in water at ambient temperatures.

Reduction of compounds of the general Formula E with specific reducing agents such as lithium aluminum tri-tertiarybutoxyhydride and the like then give compounds of the general Formula F. The corresponding 3,21-diacyl derivative may be prepared by acylation under various conditions including reaction of an acid anhydride such as acetic anhydride in the presence of an anhydrous organic base such as pyridine.

The following examples are illustrative of the invention, all temperatures being in degrees centigrade, unless otherwise stated:

EXAMPLE 1

9α-fluoro-11β,16α,17α,21-tetrahydroxypregn-5-ene-3,20-dione 16,17-acetonide

A solution of 100 mg. of 3,3-bisethylenedioxy-9-α-fluoro - 11β,16α,17α,21-tetrahydroxypregn-5-en-20-one in 10 ml. of 95% acetic acid is left at room temperature for 15 hours then diluted with water and extracted with chloroform. The chloroform extract is washed well with water and evaporated under reduced pressure. Crystallization of the residue gives 9α-fluoro-11β,16α,17α,21-tetrahydroxypregn-5-ene-3,20-dione 16,17-acetonide.

EXAMPLE 2

9α-fluoro-3β,11β,16α,17α,21-pentahydroxypregn-5-en-20-one 16,17-acetonide

To a solution of 100 mg. of 9α-fluoro-11β,16α,17α,21-tetrahydroxypregn-5-ene-3,20-dione 16,17-acetonide in 10 ml. of tetrahydrofuran freshly distilled from lithium aluminum hydride are added 200 mg. of lithium aluminum tri-tertiarybutoxyhydride and the mixture stirred at room temperature for 16 hours. It is then treated with a few ml. of saturated ammonium sulfate diluted with water and extracted with methylene chloride. The methylene chloride is washed well with water and evaporated under reduced pressure. Crystallization of the residue gives 9α - fluoro - 3β,11β,16α,17α,21 - pentahydroxypregn-5-en-20-one 16,17-acetonide.

Similarly, reduction of 9α-fluoro-21-(2-tetrahydropyranyloxy) - 11β,16α,17α - trihydroxypregn - 1,5 - diene-3,20-dione 16,17-acetonide and 9α-fluoro-21-(2-tetrahydropyranyloxy) - 11β,16α,17α - trihydroxypregn - 5 - ene-3,20-dione 16,17-acetonide give the corresponding 3β-hydroxyl derivatives.

EXAMPLE 3

9α - fluoro - 3β,11β,16α,17α,21 - pentahydroxypregn - 4-en-20-one 16,17-acetonide and 9α-fluoro-3β,11β,16α,17α,21 - pentahydroxypregn - 1,4-dien - 20 - one 16,17-acetonide Following the procedure of Example 2, but substituting 9α - fluoro - 11β,16α,17α,21 - tetrahydroxypregn - 4-ene-3,20-dione 16,17-acetonide and 9α-fluoro-11β,16α,17α,21-tetrahydroxypregna-1,4 - diene - 3,20-dione 16,17-acetonide for 9α - fluoro - 11β,16α,17α,21 - tetrahydroxypregn-5-ene-3,20-dione 16,17-acetonide, the titled compounds are obtained.

EXAMPLE 4

9α-fluoro-21-(2-tetrahydropyranyloxy)-11β,16α, 17α-trihydroxypregna-1,5-diene-3,20-dione 16,17-acetonide and 9α-fluoro-21-(2-tetrahydropyranyloxy)-11β,16α, 17α-trihydroxypregn-5-ene-3,20-dione 16,17-acetonide To a solution of 1.0 g. of 9α-fluoro-21-(2-tetrahydropyranyloxy)-11β,16α,17α-trihydroxypregn-1,4-diene-3,20-dione 16,17-acetonide in 20 ml. of dimethylsulfoxide is added 9 ml. of a suspension of approximately 20% sodium acetylide in xylene. The reaction mixture is stirred at room temperature for 30 minutes and then poured slowly into 300 ml. of ice water and extracted with methylene chloride. The methylene chloride is washed well with water and evaporated under reduced pressure. Crystallization of the mother liquor gives 9α-fluoro-21-(2 - tetrahydropyranyloxy) - 11β,16α,17α-trihydroxypregna-1,5-diene-3,20-dione 16,17-acetonide.

Similarly, by starting with 9α-fluoro-21-(2-tetrahydropyranyloxy)-11β,16α,17α-trihydroxypregn - 4 - ene - 3,20-dione 16,17-acetonide, there is obtained 9α-fluoro-21-(2-tetrahydropyranyloxy)-11β,16α,17α - trihydroxypregn - 5-ene-3,20-dione 16,17-acetonide.

By a similar procedure but substituting 1.0 g. of solid potassium t-butoxide for the sodium acetylide in xylene, the titled compounds are obtained.

EXAMPLE 5

9α-fluoro-11β,16α,17α,21-tetrahydroxy-pregn-5-ene-3,20-dione 16,17-acetonide 21-acetate A solution of 100 mg. of 9α-fluoro-11β,16α,17α,21-tetrahydroxypregn-5-ene-3,20-dione 16,17-acetonide in 10 ml. of pyridine and 5 ml. of acetic anhydride is kept at room temperature for 16 hours. It is then diluted with ice water and extracted with chloroform. The chloroform is washed with water, then successively with 2 N hydrochloric acid, 5% sodium bicarbonate and water and evaporated under reduced pressure. Crystallization of the residue gives 9α-fluoro-11β,16α,17α,21-tetrahydroxypregn-5-ene-3,20-dione 16,17-acetonide 21-acetate.

Similarly, from the title compounds of Examples 2 and 3, the corresponding 3,21-diacetates are prepared.

The invention may be variously otherwise embodied within the scope of the appended claims.

What is claimed is:

1. A compound having the formula

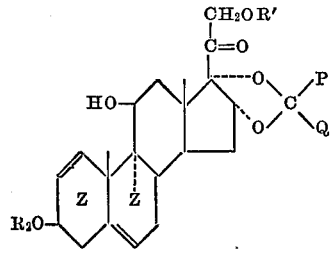

or

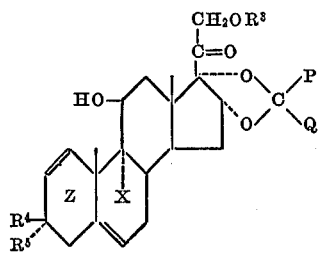

wherein R' is hydrogen or acyl; $R^2$ is hydrogen or acyl; $R^3$ is hydrogen, acyl or 2-tetrahydropyranyl; the acyl in each instance being a hydrocarbon carboxylic acid of less than twelve carbons; $R^4$ is hydroxy or acyloxy, $R^5$ is hydrogen and $R^4$ and $R^5$ together are oxo (O=); X is halogen; P is hydrogen, lower alkyl, halo lower alkyl, carboxy lower alkyl or a salt or ester thereof, monocyclic cycloalkyl, monocyclic aryl, monocyclic aryl lower alkyl, monocyclic heterocyclic or monocyclic heterocyclic lower alkyl, and Q is lower alkyl, halo lower alkyl, carboxy lower alkyl or a salt or ester thereof, monocyclic cycloalkyl, monocyclic aryl, monocyclic aryl lower alkyl, monocyclic heterocyclic or monocyclic heterocyclic lower alkyl, or together with the carbon atom to which they are joined P and Q are cycloalkyl or monocyclic heterocyclic; and Z indicates a single or a double bond.

2. A compound in accordance with claim 1 having the name 9α-fluoro-3β,11β,16α,17α,21-pentahydroxypregn-4-en-20-one 16,17-acetonide.

3. A compound in accordance with claim 1 having the name 9α-fluoro-3β,11β,16α,17α-21-pentahydroxypregn-4 4-dien-20-one 16,17-acetonide.

4. A compound in accordance with claim 1 having the name 9α-fluoro-11β,16α,17α,21-tetrahydroxypregn-5-ene-3,20-dione 16,17 acetonide.

5. A compound in accordance with claim 1 having the name 9α-fluoro-3β,11β,16α,17α,21-pentahydroxypregn-5-en-20-one 16,17-acetonide.

6. A compound in accordance with claim 1 having the name 9α-fluoro-21-(2-tetrahydropyranyloxy)-3β,11β,16α, 17α-tetrahydroxypregn-1,5-diene-20-one 16,17-acetonide.

7. A compound in accordance with claim 1 having the name 9α-fluoro-21-(2-tetrahydropyranyloxy)-3β,11β,16α, 17α-tetrahydroxypregn-5-ene-20-one 16,17-acetonide.

8. A compound in accordance with claim 1 having the name 9α-fluoro-3β,11β,16α,17α-pentahydroxypregn-5-en-20-one 16,17 acetonide-3,21-diacetate.

9. A compound in accordance with claim 1 having the name 9α-fluoro-3β,11β,16α,17α,21-pentahydroxypregn-4-en-20-one 16,17-acetonide-3,21-diacetate.

10. A compound in accordance with claim 1 having the name 9α-fluoro-3β,11β,16α,17α,21-pentahydroxypregn-1, 4-dien-20-one-one 16,17-acetonide-3,21-diacetate.

References Cited

UNITED STATES PATENTS

| 3,097,199 | 7/1963 | Bowers | 260—239.55 |
| 3,173,914 | 3/1965 | Bowers | 260—239.55 |
| 3,197,469 | 7/1965 | Fried | 260—239.55 |
| 3,210,340 | 10/1965 | Bowers, et al. | 260—239.55 |

OTHER REFERENCES

Deghenghi et al.: Jour. Med. Chem., July 1966, pp. 513–516.

LEWIS GOTTS, Primary Examiner

E. G. LOVE, Assistant Examiner

U.S. Cl. X.R.

424—241

PO-1050
(5/69)

UNITED STATES PATENT OFFICE
CERTIFICATE OF CORRECTION

Patent No. 3,541,602      Dated   November 17, 1970

Inventor(s) Patrick A. Diassi

It is certified that error appears in the above-identified patent and that said Letters Patent are hereby corrected as shown below:

Column 1, third formula

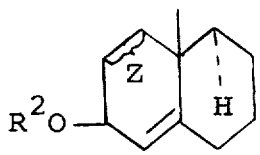    should read    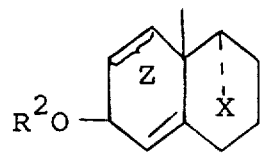

Column 2, line 46, "0.1" should read--0.01--. Column 4, line 3 "9-α-" should read--9α- --. Column 5, first formula

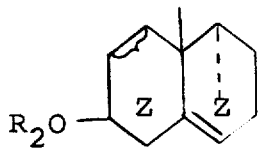    should read    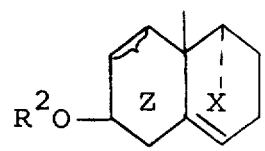

Column 6, line 23, "pentahydroxypregn-4" should read--pentahydroxypregn-1,--; and on line 48, "20-one-one" should read--20-one--.

SIGNED AND
SEALED
MAR 9 1971

(SEAL)
Attest:

Edward M. Fletcher, Jr.
Attesting Officer

WILLIAM E. SCHUYLER, JR
Commissioner of Patents